No. 626,966. Patented June 13, 1899.
J. CONZETT.
STALK AND WEED PULLER.
(Application filed Mar. 10, 1899.)
(No Model.)
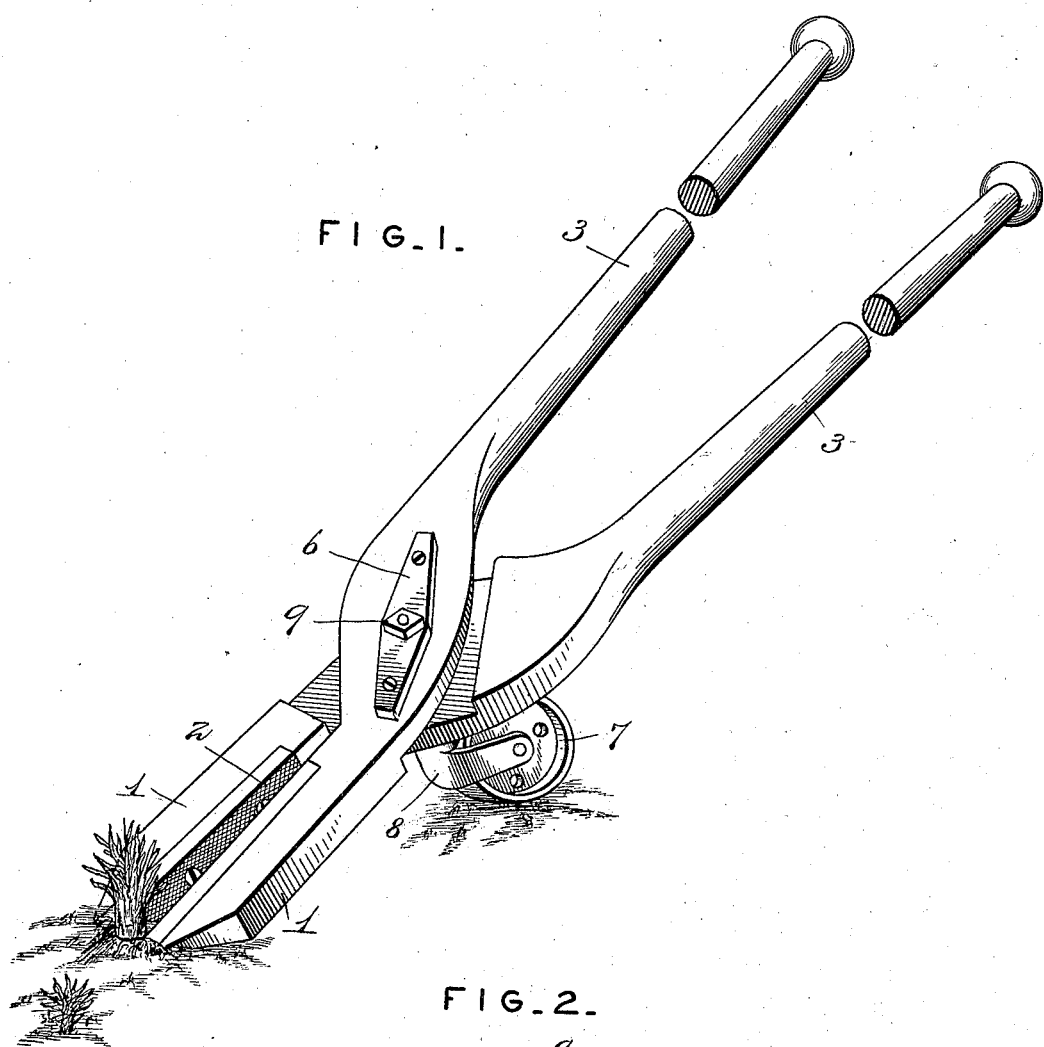
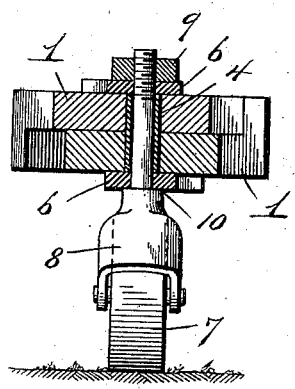
Witnesses
Harry L. Amel
K. A. Nau
Inventor
John Conzett.
By W. D. Stockbridge
Attorney
THE NORRIS PETERS CO., PHOTO-LITHO., WASHINGTON, D. C.

UNITED STATES PATENT OFFICE.

JOHN CONZETT, OF FERNDALE, CALIFORNIA.

STALK AND WEED PULLER.

SPECIFICATION forming part of Letters Patent No. 626,966, dated June 13, 1899.

Application filed March 10, 1899. Serial No. 708,541. (No model.)

*To all whom it may concern:*

Be it known that I, JOHN CONZETT, a citizen of the Republic of Switzerland, residing at Ferndale, in the county of Humboldt and State of California, have invented certain new and useful Improvements in Stalk and Weed Pullers; and I do hereby declare the following to be a full, clear, and exact description of the invention, such as will enable others skilled in the art to which it appertains to make and use the same.

This invention relates to stalk and weed pullers.

The object of the invention is to provide a convenient implement for grubbing and clearing land of weeds and stalks, such as thistles, mullen, burdock, and the like. The invention is especially adapted for pulling up by the roots weeds of the character indicated, such as in their growth form a sort of hummock around them.

The invention consists in the combination of a pair of jaws pivoted together and having arms or handles extending from them and a roller or caster pivoted or swiveled in the pivot of the jaws.

It also consists in other details of construction hereinafter described and claimed.

In the drawings, Figure 1 is a perspective showing my invention applied to use and ready to pull a weed up by the roots. Fig. 2 is a cross-section through the pivot of the jaws, showing the means for coupling the jaws and swiveling the caster.

1 1 are jaws the clamping-faces of which are roughened or provided with short blunt teeth, as shown at 2, the ends of the jaws being beveled or chamfered upon their under sides and also upon their outer sides to form points or cutting edges for easy insertion into the earth for grasping a weed or plant close to or below the surface of the ground, so as to pull the roots up with the weed. The jaws are provided with or formed integral with handle-arms 3 3, as shown, and the jaws are pivoted together by means of a tube or sleeve 4, which extends through the substance of the jaws. By preference I apply reinforcing or strengthening plates 6 6, one to each jaw, having a perforation or hole corresponding in diameter to and registering with the passage through the pivot, these plates serving as shoulders for holding the sleeve-pivot from endwise movement when the parts are assembled.

7 is a caster-wheel carried by bracket or frame 8, the shank of which passes through the tubular pivot and the reinforcing-plates and is held in its position by means of a tap or nut 9. The shank of the caster-bracket is provided with an abrupt shoulder 10, forming a bearing between it and the outer face of the lower strengthening-plate.

By this construction and organization of the jaws, handles, and caster I have provided a grubbing implement simple and economical in construction and convenient and efficient in use for the purposes noted.

Having described my invention, I claim as new—

1. A grubbing or weeding implement, consisting of the combination of a pair of jaws, a tubular pivot, and a caster swiveled or pivoted within the pivot, substantially as described.

2. A grubbing or weeding implement, involving the combination of a pair of jaws chamfered or beveled to a point, as described, a tubular pivot, and a caster swiveled within the pivot, substantially as described.

3. A grubbing or weeding implement, involving the combination of a pair of jaws beveled or chamfered to a point, as described, a tubular pivot, strengthening and holding plates connected with the jaws, and a caster swiveled in the pivot and strengthening-plates, substantially as described.

In testimony whereof I affix my signature in presence of two witnesses.

JOHN CONZETT.

Witnesses:
W. H. ROBARTS,
JAS. SMITH.